Figure 1:
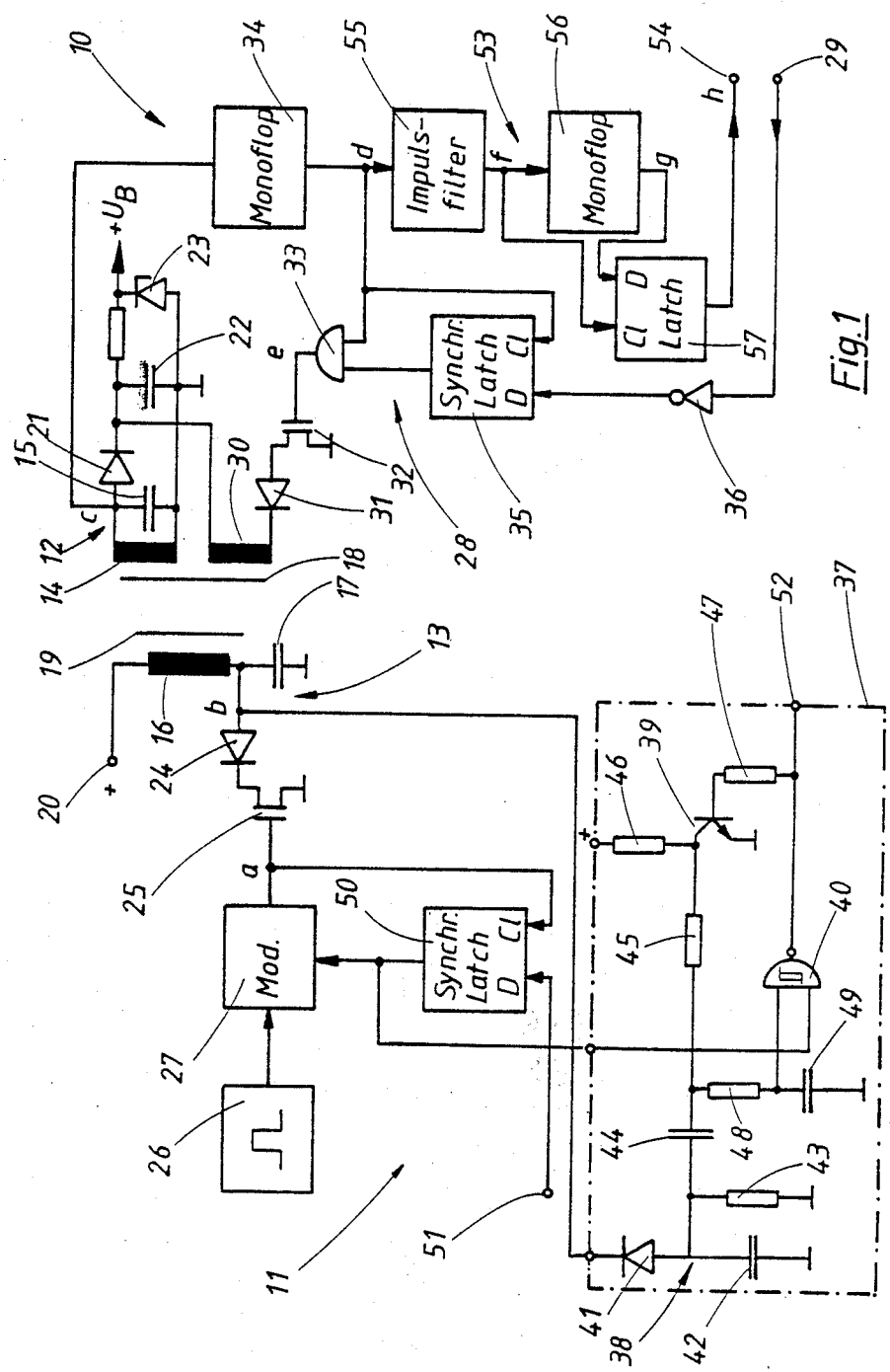

United States Patent [19]
Fauser et al.

[11] Patent Number: 4,665,399
[45] Date of Patent: May 12, 1987

[54] DEVICE FOR TRANSMITTING OF BINARY DATA BETWEEN A MOBILE DATA CARRIER AND A STATIONARY STATION

[75] Inventors: Edwin Fauser, Ditzingen; Hans List, Pforzheim; Günter Schirmer, Ingersheim, all of Fed. Rep. of Germany

[73] Assignee: Robert Bosch GmbH, Stuttgart, Fed. Rep. of Germany

[21] Appl. No.: 783,226

[22] PCT Filed: Mar. 14, 1985

[86] PCT No.: PCT/DE85/00081
§ 371 Date: Sep. 19, 1985
§ 102(e) Date: Sep. 19, 1985

[87] PCT Pub. No.: WO86/01058
PCT Pub. Date: Feb. 13, 1986

[30] Foreign Application Priority Data
Jul. 26, 1984 [DE] Fed. Rep. of Germany ....... 3427581

[51] Int. Cl.[4] .............................................. G08C 19/08
[52] U.S. Cl. ........................... 340/870.32; 340/825.71
[58] Field of Search ...................... 340/870.31, 825.71, 340/870.32, 531, 679, 680; 336/30

[56] References Cited
U.S. PATENT DOCUMENTS
3,026,504 3/1962 Aurand et al. ............. 340/870.31 X FOREIGN PATENT DOCUMENTS
3331694 3/1985 Fed. Rep. of Germany .

Primary Examiner—Jerry M. Myracle
Attorney, Agent, or Firm—Michael J. Striker

[57] ABSTRACT

A device for transmitting of binary data between a mobile data carrier (10) and a stationary station (11) is provided with a first resonance circuit (13) in the stationary station (11), whereby a switchable field effect transistor (25) is parallel switched to its condenser (17) by means of a switching pulse sequence, a second resonance circuit (12) in the data carrier (10) which is at least conductively coupled for a short time with the first resonance circuit (13). For the purpose of enlarging the inductively to be bridged distances between the resonance circuits (12,13) of data carrier (10) and stationary station (11) without impairing the operating safety during the data transmission the resonance circuit (13) in the stationary station (11) is designed in such a manner that its resonance frequency is about equal to the switching pulse sequence. The data transmission from the data carrier (10) to the stationary station (11) is performed by amplitude demodulation in the data carrier (10) and by amplitude demodulation in the stationary station (11). The data transmission from the stationary station (11) to the data carrier (10) is performed by frequency demodulation, whereby the frequency ratio is adjusted to 2:1.

18 Claims, 4 Drawing Figures

DEVICE FOR TRANSMITTING OF BINARY DATA BETWEEN A MOBILE DATA CARRIER AND A STATIONARY STATION

STATE OF THE ART

The invention relates to a device for transmitting of binary data between a mobile data carrier an a stationary station, in particular between a workpiece support and a finishing or control station on transfer conveyors or assembly conveyors of the type stated in claim 1.

In an already suggested device of this type (DE-OS 33 31 694) the two resonant circuits which are mounted on ferrite cores are guided along very tightly with respect to each other when passing each other for safeguarding the data transmission during a data transmission between the data carrier formed by a workpiece support and a stationary station formed by a finishing or control station. This requires a very accurate positioning of the workpiece support on the assembly conveyors. The operating safety of the data transmission suffers if the workpiece support is not accurately aligned. The fading out process in the inductively coupled coils is time delayed or time accelerated depending on the binary values of the data at the side of the data carrier for a data transmission from the data carrier to the stationary station. The voltage value is scanned during a fading out process at a certain point in time on the stationary station for demodulating the transmitted data and the binary value is determined therefrom.

For the data transmission from the stationary station to the mobile data carrier the frequency of the switch pulse sequence for transmitting the binary value is fixed logically 1 to f and for transmitting the binary value logically 0 to 4/5f. BY a frequency modulation on the data carrier side, the transmitted binary value is recovered.

ADVANTAGES OF THE INVENTION

The device in accordance with the invention with the features of claim 1 has the advantage that the distances which have to be inductively bridged between the data carrier and the stationary station can be enlarged without impairing the operating safety. The maximum permissible distance between the coils is at least doubled with respect to the known unit by means of the resonance transmission. This means a larger permisssible tolerance range when aligning the tool support in the transfer conveyor or on the assembly conveyor. By means of the amplitude modulation during the data transmission from the data carrier to the stationary station the device also becomes less critical against a change in the stray inductance and against structural element tolerances.

Advantageous embodiments of the invention are obvious from the further claims 2–13.

An advantageous embodiment of the invention results from claim 5. A sufficient restoration of the binary signal from the data carrier to the stationary station is assured by this structure of the demodulation circuit to the stationary station side of the amplitude demodulation, without being influenced by slow fluctuations of the pulses of the transmitter being formed by the coils, for example, by changing the distance of the ferrite cores of the two resonance circuits. In particular, it is assured that the pulse width of the binary signals is not unduly changed which is particularly important for a sufficient data transmission.

An advantageous embodiment of the invention results from claim 7. In view of the frequency jump 2:1 during the data transmission from the stationary station to the data carrier it is assured that the device remains securely in resonance.

An advantageous embodiment of the invention also results from claim 4 and 11. In view of the given synchronisation latch it is assured that a change of the data signals to be transmitted becomes only effective at the beginning of the next cycle period.

DRAWING

Figure 2:
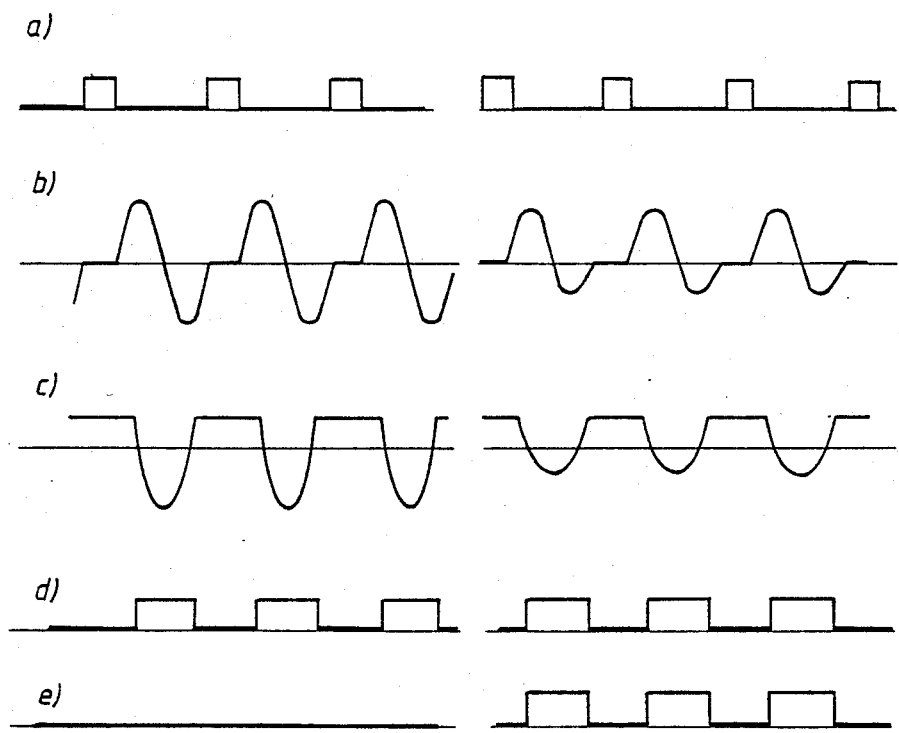
Figure 3:
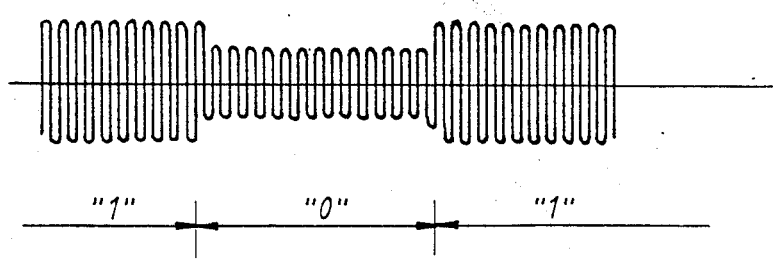
Figure 4:
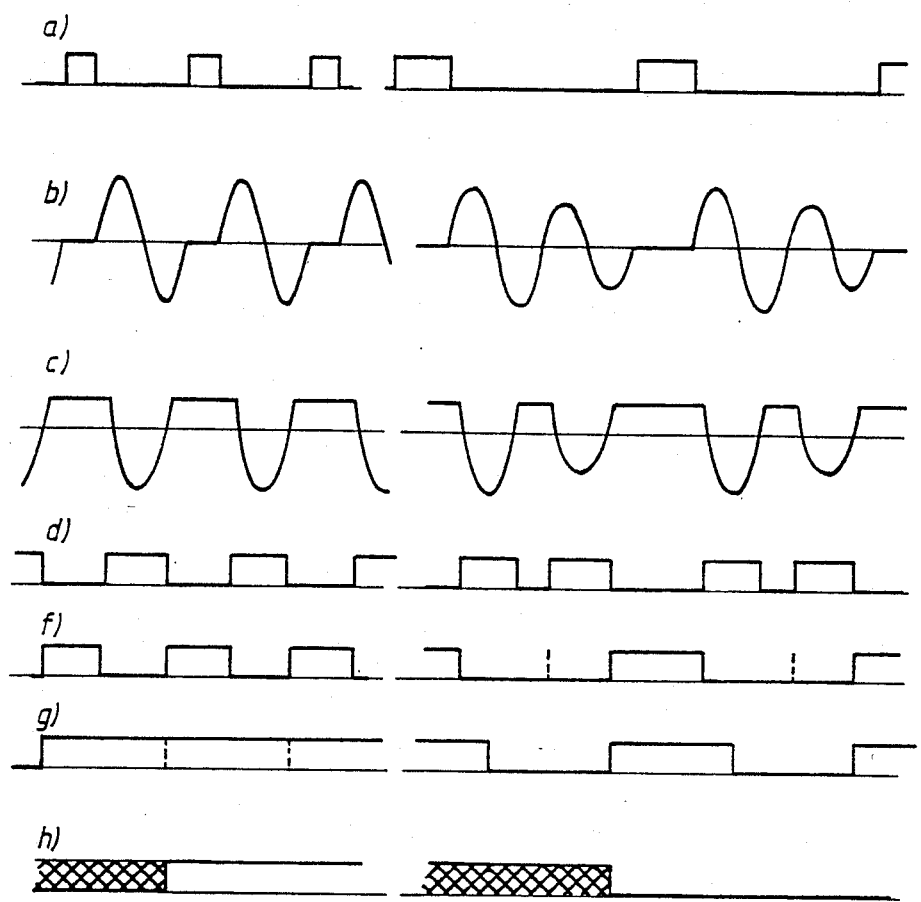

The invention is explained by means of an exemplified embodiment illustrated in the drawing and is explained in more detail in the following. The drawing shows:

FIG. 1 is a circuit diagram of a device for data transmission from a mobile data carrier to a stationary station and vice versa, FIG. 2 (including parts a–e) is a diagram of the signal path at selected locations in the circuit diagram of the device in accordance with FIG. 1 when transmitting of data from the mobile data carrier to the stationary station, FIG. 3 an illustration of the signal path at the input of a demodulation circuit on the stationary station side in the device in accordance with FIG. 1 during the transmission of data from the data carrier to the stationary station, FIG. 4 (including parts a–h) is a diagram of the signal path at selected locations in the circuit diagram of the device in accordance with FIG. 1 during the transmission of data from the stationary station to the data carrier.

DESCRIPTION OF THE EXEMPLIFIED EMBODIMENT

The device illustrated in the circuit diagram of FIG. 1 for transmitting of binary data between a mobile data carrier 10 and a stationary station 11 acts for picking up data from workpiece supports which run through a transfer conveyor on a transport conveyor or assembly conveyor, through a finishing or control station and for registering new data into the workpiece supports relating to new data of finishing or transport information. A transfer conveyor with such devices is discribed in detail in the DE-OS 33 31 694, for example. One each resonance circuit 12 or 13 is mounted on the data carrier 10 and on the stationary station 11, whereby the resonance circuit 12 consists of a coil 14 and a condenser 15 as a parallel resonance circuit and the resonance circuit 13 consists of a coil 16 and a condenser 17 as a series resonance circuit. Coils 14 and 16 are mounted on a ferrite core 18 and 19. The ferrite cores 18,19 are guided past each other with a distance for the data transmission, whereby the coils 14 and 16 are inductively coupled with each other for a short time. A direct current source 20 for the power supply of the stationary station 11 is provided on which the series resonance circuit 13 is coupled, while the power supply of the data carrier 10 is derived from the inductively transmitted energy from the stationary station. For this purpose a condenser 22 is parallel switched by means of a diode 21 for condenser 15 of the parallel resonance circuit 14, whose charge voltage is available as a supply voltage $U_B$ after a voltage limitation by means of a Zener diode 23.

An electronic switch in form of a field effect transistor (FET) 25 is switched parallel to the condenser 16 of the series resonance circuit 13 by means of a diode 24. Thereby, the anode of the diode 24 is connected with the condenser 17 and the cathode with the FET 25. The FET 25 is switched by means of a switch pulse sequence which is made available by a pulse generator 26 in form of rectangulr pulses. A modulator 27 is disposed between the pulse generator 26 and the control input of the FET 25 which reduces the 4 MHz-pulse sequence of the pulse generator 26 to 1 MHz or 0.5 MHz, respectively. The transmitting degree, e.g., the ratio between the pulse width with respect to the period duration remains constant. Such a modulator 27 may consist of the series circuit of two frequency dividers, for example, whereby the one frequency divider divides by 4 and the other frequency divides by 2. The frequency divider which divides by 2 may be bridged by means of a switch and can be rendered ineffective.

A modulation circuit 28 is connected on the resonance circuit 12 of the mobile data carrier 10 for transmitting the binary data, which are stored in a storage (not shown) in the mobile data carrier 10, to the stationary station 11, and that through the input 29 of this modulation circuit the read binary data from the storage of the data carrier 10 are fed thereto. The modulation circuit 28 acts as an amplitude modulator and influences the resonance processes in the two resonance circuits 12,13. For this purpose the modulation circuit 28 is provided with a further coil 30 which is also mounted on the ferrite core 18 which is switched in series with a diode 31 and a further field effect transistor (FET) 32, the condenser 15 of the resonance circuit 12 and being switched parallel by an intermediary switching of diode 21. Thereby, diode 31 is poled in such a manner that its cathode is disposed immediately or above coil 30 on the cathode of diode 21. The FET is controlled by an AND-gate 33, whose one input is connected with the output of a monoflop 34 which on its input side is connected to the resonance circuit 12. At the other input of the AND-gate 33 is the output of a synchronization latch 35 which is formed as a D-Flip-Flop, whose D-input is connected with the input 29 by means of an inverter 36 and whose cycle input is connected with the output of the monoflop 34. Depending whether the binary value "0" or "1" is applied on the input 29 of the modulation circuit 28, the FET 25 is switched through or closed and the resonance process is influenced in the resonance circuit 13,14 or not.

A demodulation circuit 37 for the demodulation of the resonance process in the resonance circuit 13 is provided for demodulating the transmitted binary values in the stationary station 11. The demodulation circuit 37 is switched parallel to the condenser 17 of the resonance circuit 13 and is provided with a peak rectifier 38, a transistor 39 which is connected on the direct current source 30 and a NAND-gate 40 with a Schmitt-trigger-input. The peak rectifier which consists of the diode 41, condenser 42 and resistor 43 scans the negative halve wave of the voltage path on the capacitor 17 of the resonance circuit 13 by a corresponding poling of diode 41 and is connected with the collector of transistor 39 by means of a high pass from the capacitor 44 and the resistor 45 for separating the equal part, whereby the transistor is also connected on the direct current source 20 by means of a resistor 46. The base of the npn-transistor 39 is connected by means of a resistor 47 with the output of the NAND-gate 40. The one input of the NAND-gate 40 is connected on the capacitor 44 of the high pass by means of a low pass consisting of a resistor 48 and a condenser 49 for suppressing the residue waviness of the peak rectifier 38, while a synchronisation bit is applied on the other input of the NAND-gate 40. This synchronization bit is picked off in form of a D-Flip-Flop at the output of a synchronisation latch 50. The synchronisation latch 50 which is connected with the modulator 27 causes a reduction of the pulse frequency of the pulse generator 26 to either 1 MHz (binary value 1) or to 0.5 MHz (binary value 0), depending on the binary value which is applied on its D-input. For this purpose the D-input of the synchronisation latch 50 is connected with a data input and the cycle input with the output of the modulator 27.

The mode of operation of the device during the transmission of data from the mobile data carrier 10 to the stationary station 11 is as follows:

The FET 25 is controlled with a switch pulse sequence of 1 MHZ as illustrated in FIG. 2a. The series resonance circuit 13 is so designed that its resonance frequency is about equal to the frequency of the switch pulse sequence. The resonance frequency $f_0$ is calculated in known manner $$f_0 = \frac{1}{2\pi L \sqrt{.\,C}}$$

whereby L is the inductivity of the coil 16 and C the capacitance of the capacitor 17. In view of this design of the resonance circuit 13 the zero gate of the resonance in the resonance circuit is directly at the switch on point of the FET 25. The path of the voltage which is thereby generated on the capacitor 17 is illustrated in FIG. 2b. The resonance which is triggered in the inductively coupled resonance circuit 12 of the data carrier causes a voltage path on the capacitor 15, as illustrated in FIG. 2c. The monoflop 34 is set with the negative flank of the voltage path, which again drops back after its adjustable restoring time. The resulting signal path at the output of the monoflop 34 is illustrated in FIG. 2d. If the binary value "1" is read from the data storage of the mobile data carrier 10 and fed to the input 29 of the modulation circuit 28, logically "0" is always applied on the output of the NAND-gate 33 (FIG. 2e). Thereby the FET 32 remains always closed and there is no intervention in the resonance process of the resonance circuit 12. The signal path on the switching points a–e is illustrated in FIG. 2 in the left lower side beneath the partial FIG. a–e. However, if the binary value "0" is applied on the data input 21, a signal path is generated on the output of the NAND-gate 33, as illustrated in FIG. 2e on the right side of the Fig. The FET-32 is accordingly opened and closed, whereby an intervention occurs in the resonance process in the resonance circuits 12 and 13 in such a manner that in particular the negative half wave of the resonance is reduced in its amplitude. The corresponding signal path on capacitor 15 and on capacitor 17 is illustrated in FIG. 2 on the right side beneath the partial FIG. b and c. A signal path is present at point b of the circuit and thereby at the input of the demodulation circuit 37, as illustrated schematically in FIG. 3. The amplitude modulation can be clearly recognized during the transmission of the binary value "0". It can also be clearly recognized that during the transition from one binary value to the other an obliteration occurs in the signal path, which in particular does not permit the clear recognition of the width of the data. The original binary values are regenerated from this signal path with the demodulation circuit 37, that is, in their original length or duration. These binary values can be picked off on the output 52 of the demodulation circuit 37.

The amplitude demodulation for recovering the binary value is performed in the demodulation circuit 37 as follows: During the data transmission from the data carrier 10 to the stationary station 11 the synchronisation bit at the output of the synchronisation latch 50 is always on logic 1. During the unmodulated resonance, which corresponds to the transmission of the binary value "1", the NAND-gate 40 is always at the output on logic 1, thus the transistor 39 is switched on conductivity. Thereby, the other input of the NAND-gate 40 is quasi on mass by means of the resistors 48 and 45 and thereby on logic "0". During the transmission of the binary value "0" is modulated and the peak rectifier 38 picks up a positive flank in the signal path (FIG. 3), which reaches the input of the NAND-gate 40 by means of the capacitor 44 and the resistor 48. The NAND-gate 40 moves at the output from logic 1 to logic 0, the transistor 39 is closed and the input of the NAND-gate 40 is cleanly drawn to logic 1. When the binary value "1" is again transmitted a negative flank is generated due to the increase of the signal amplitude at the output of the peak rectifier 38, which again moves the input of the NAND-gate 40 again to logic 0 for a short time by means of the condenser 44 and the resistor 48. Thus, the output of the NAND-gate 40 moves again to logic 1, the transistor 39 becomes conductive and maintains the input of the NAND-gate 40 on the logic 0. The binary values can be picked off in their exact original length or time duration at the output 52 of the demodulation circuit 37.

The data transmission from the stationary station 11 to the mobile data carrier 10 is performed by frequency modulation. If the binary value "1" should be transmitted, a switching pulse sequence of the frequency 1 MHz is applied on the input of FET 25, as illustrated in FIG. 4a at the left side. If the binary value "0" should be transmitted, a switching pulse sequence of 0.5 MHz is applied on the input of the FET 25, as illustrated in FIG. 4a on the right side. Thus, the frequency ratio is 2:1 and the ratio of the pulse length 1:2. Thereby, the degree of transmitting of the two switching pulse sequences is equally large. The signal path on the capacitor 17 of the resonance circuit 13 and on the capacitor 15 of the resonance circuit 12 in both switching pulse sequences is illustrated in FIG. 4b and c.

For recovering the transmitted data, a demodulation circuit 53 is provided on the side of the data carrier on the output 54 of which the recovered binary data can be picked off. The demodulation circuit 53 is provided with a monoflop which is connected to the resonance circuit 12 and which is formed by the monoflop 34, a pulse filter 55, a retriggerable monoflop 56 and a D-Flip-Flop 57, whose output is connected with the output 54 of the demodulation circuit 53. Thereby, the pulse filter 55 is switched successively to the monoflop 34 and the monoflop 56 is switched successively to the pulse filter 55. The D-input of the D-Flip-Flop 57 is connected with the output of the monoflop 56 and the cycle input of the D-Flip-Flop is connected with the output of the pulse filter 55. The monoflop 34 is triggered with the negative flank in the voltage path on the capacitor 15 of the resonance circuit 12 (FIG. 4c), whose resetting time is smaller than a resonance period in the signal path. A pulse sequency is applied on the output of the monoflop 34, as illustrated in FIG. 4d. The pulse filter 55 serves for suppressing every second pulse at the output of the monoflop 34 (FIG. 4d right), in the case of transmitting the binary value "0". For example, this pulse filter 55 may be designed as a retriggerable monoflop, whose resetting time at least corresponds to the time distance of the positive flank of the first and the second pulse. The pulse filter 35 which is designed as a retriggerable monoflop is always set with the positive flank of the pulses applied on the input. On the $\overline{Q}$-output of the pulse filter 55 a pulse sequence is always applied which is illustrated in FIG. 4f. On the one hand, these pulses are applied as Clock-pulses on the D-Flip-Flop 57 and trigger with their positive flank the monoflop, on the other hand. The reset time of the retriggerable monoflop 56 is designed in such a manner that it is at least at large as the reverse value of the frequency of the pulse sequence at the output of the pulse filter 55 in the case of transmitting the binary value "1" (FIG. 4f left). A signal path is then generated on the output of the monoflop 56, as illustrated in FIG. 4g. Since the output of the D-Flip-Flop 57 takes over the condition of the D-input with each positive pulse flank, the binary value "1" (FIG. 4h left) and the binary value "0" (FIG. 4h right) are picked off on the output 54 of the demodulation circuit 53 and corresponding to the binary value "1" or "0" which were fed to the input 51 in the stationary station 11. The synchronisation latch 50 assures that a change of the data signal from "1" to "0" and vice versa become effective only at the start of the next cycle period. The same function is performed by the synchronisation latch 35 during the data transmission during the data transmission from the data carrier 10 to the stationary station 11.

The invention is not limited to the aforedescribed exemplified embodiment for a device to transmit data. The demodulation circuit 37 in the stationary station 11 can also be designed differently. However, in any case the demodulation circuit must perform an amplitude modulation of the signal path which had been picked off from the condenser 17 of the resonance circuit 13. The described demodulation circuit 37 is particularly advantageous, since it sufficiently restores the logical level of the transmitted signal, without influencing it by slow fluctuations of the resonance in the signal. The obliteration which is recognizeable in the amplitude modulated signal is regenerated so that the duration of the logical level cannot be unduly changed.

We claim:
1. A device for transmitting binary data between a mobile data carrier (10) and a stationary station (11), the data carrier (10) having a passing movement past the stationary station (11), in particular between a workpiece support and one of a finishing station and a control station on one of transfer conveyors and assembly conveyors, the device comprising:
    means for transmitting binary data between a mobile data carrier (10) and a stationary station (11) and including a first resonance circuit (13) associable with the stationary station and having a capacitor (17), a first coil (16) and a first resonance frequency, and a second resonance circuit (12) associable with the data carrier and having a second coil (14) inductively coupled, at least for a short time, with said first coil (16) during a passing movement of the data carrier past the stationary station, said second resonance circuit (12) having a reso- nance with an amplitude when said second coil (14) is inductively coupled with said first coil (16);

means for providing at least one switch pulse sequence with a frequency and including a first electronic switch (25) connected in parallel to said capacitor (17) of said first resonance circuit (13);

means for influencing said resonance in dependency upon one of two binary values of data to be transmitted by the data carrier to the stationary station and including a modulation circuit (28) connected with said second resonance circuit (12); and means for recovering a binary value when transmitted and including a demodulation circuit (37) connected with said first resonance circuit (13), said first resonance circuit (13) being formed so that said first resonance frequency is about equal to said frequency of said switch pulse sequence, said influencing means being formed to modulate said amplitude of said resonance, and said recovering means being formed to recover the binary value in said first resonance circuit (13) by amplitude demodulation of said resonance.

2. A device as defined in claim 1, wherein said first electronic switch (25) is formed as a transistor.

3. A device as defined in claim 1, wherein said providing means is formed so that said switch pulse sequence has a frequency halvable in dependency on one of two binary values of the data to be transmitted from the stationary station to the data carrier.

4. A device as defined in claim 1, wherein said modulation circuit (28) is formed such that an amplitude modulation of said second resonance circuit (12) is substantially performable only in a negative semiwave of said second resonance circuit (12).

5. A device as defined in claim 1, wherein said modulation circuit (28) has a further coil (30), said transmitting means further including a ferrite core (18) on which said second coil (14) and said further coil (30) are disposed, a second electronic switch (32) having a control input side, an AND-gate (33) with a first input side and a second input side and an output side, said first input side being formed so that the data to be transmitted from the data carrier is applicable to said first input side of said AND-gate, said output side being being connected to said control input side of said second electronic switch (32), a diode (21), and a monoflop (34) having an input side connected to said second resonance circuit (12) and an output side connected to said second input side of said AND-gate (33), said second electronic switch (32) being connected in series with said further coil (30) and in parallel with said diode (21).

6. A device as defined in claim 5, wherein said second electronic switch (32) is formed as a field effect transistor.

7. A device as defined in claim 5, wherein said modulation circuit (28) further includes a synchronization latch (35) formed as a D-flip-flop located upstream of said first input side of said AND-gate (33) and having a D-input side, said D-input side being formed so that the data to be transmitted is appliable in an inverted manner to said D-input side, said synchronization latch (35) also having a cycle input side connected with said output side of said monoflop (34).

8. A device as defined in claim 7, wherein said providing means includes a plurality of said switch pulse sequences, each of said switch pulse sequences having a transmitting degree associated with each binary value that is equally uniform.

9. A device as defined in claim 1, wherein said first electronic switch (25) has a control input terminal; further comprising:

means for generating said switch pulse sequence including a rectangular-wave generator (26) having an output port connected to said control input terminal of said first electronic switch (25) in said first resonance circuit (13), and including a frequency modulator (27) formed so that said frequency of said switch pulse sequence is halved and a duration of said switch pulse sequence is doubled when applying one of two binary values of the data to be transmitted to the data carrier (10).

10. A device as defined in claim 9, further comprising:

means for applying binary values to said frequency modulator (27) and including a synchronization latch (50), said frequency modulator (27) having an output port, said synchronization latch (50) being formed as a D-flip-flop having a cycle input connected to said output port of said frequency modulator (27) and having a D-input port formed so that the binary values are immediately available.

11. The device as defined in claim 10, wherein said recovering means includes a synchronization latch (50) with an output connected to said second input side of said NAND-gate (40).

12. The device as defined in claim 1, wherein said second resonance circuit has an output, said recovering means including a further demodulation circuit (53) for recovering data transmitted from the stationary station (11) to the data carrier (10) and being connected to said second resonance circuit (12), said further demodulation circuit (53) including a first monoflop (34) having an input connected to said output of said second resonance circuit (12) and having an output, a pulse filter (55) having an input connected to said output of said first monoflop (34) and an output, a second monoflop (56) having an input connected to said output of said pulse filter (55) and having an output, and a D-flip-flop (57) having a D-input connected to said output of said second monoflop and having a cycle input connected to said output of said pulse filter (55) and having an output formed so that transmitted data can be removed therefrom.

13. A device as defined in claim 12, wherein said modulation circuit (28) also includes said first monoflop (34).

14. A device as defined in claim 1, further comprising:

a direct voltage supply (20), said demodulation circuit (37) including a peak rectifier (38) effective in a negative semiwave of said resonance, a NAND-gate (40) and having a first and second input side and an output side, a third electronic switch (39) connected to said direct voltage supply (20) and said NAND-gate (40), said peak rectifier (38) having an output connected to said third electronic switch (39), a high pass filter (44, 45) connecting said third electronic switch (39) to said direct voltage supply (20), and a low pass filter (48, 49) connecting said first input side of said NAND-gate (40), said second input side of said NAND-gate (40) being formed so that a synchronization bit is appliable thereon, said output side of said NAND-gate (40) being connected to said control input side of said third electronic switch (39).

15. A device as defined in claim 14, wherein said NAND-gate (40) has a Schmitt-trigger input.

16. The device as defined in claim 14, wherein said recovering means includes a synchronization latch (50) with an output connected to said second input side of said NAND-gate (40).

17. A device as defined in claim 14, wherein said electronic switch (39) in formed as a npn-transistor, said second input side of said NAND-gate (40) being formed such that said synchronization bit appliable thereon is provided with a binary value logic of "1".

18. The device as defined in claim 17, wherein said recovering means includes a synchronization latch (50) with an output connected to said second input side of said NAND-gate (40).

* * * * *